(12) United States Patent
DeSchryver et al.

(10) Patent No.: US 8,645,420 B2
(45) Date of Patent: Feb. 4, 2014

(54) METHODOLOGY FRAMEWORK AND DELIVERY VEHICLE

(75) Inventors: Elizabeth DeSchryver, Evanston, IL (US); Deirdre C. O'Riordan, Arlington Heights, IL (US)

(73) Assignee: Accenture Global Services Limited, Dublin (IE)

( * ) Notice: Subject to any disclaimer, the term of this patent is extended or adjusted under 35 U.S.C. 154(b) by 3953 days.

(21) Appl. No.: 10/634,250

(22) Filed: Aug. 5, 2003

(65) Prior Publication Data

US 2005/0034098 A1 Feb. 10, 2005

(51) Int. Cl.
*G06F 7/00* (2006.01)
*G06F 17/30* (2006.01)

(52) U.S. Cl.
USPC .......................................... 707/778; 707/792

(58) Field of Classification Search
USPC ................................. 707/778, 792
See application file for complete search history.

(56) References Cited

U.S. PATENT DOCUMENTS

| | | | |
|---|---|---|---|
| 4,899,292 A | 2/1990 | Montagna et al. | |
| 5,761,674 A | 6/1998 | Ito | |
| 5,778,381 A | 7/1998 | Sandifier | |
| 5,920,846 A | 7/1999 | Storch et al. | |
| 5,977,967 A | 11/1999 | Berner et al. | |
| 6,067,486 A | 5/2000 | Aragones et al. | |
| 6,101,481 A | 8/2000 | Miller | |
| 6,192,325 B1 | 2/2001 | Piety et al. | |
| 6,349,274 B1 | 2/2002 | Kay et al. | |
| 6,678,716 B1 * | 1/2004 | Pronsati et al. | 709/201 |
| 6,886,007 B2 | 4/2005 | Leymann et al. | |
| 2002/0026297 A1 * | 2/2002 | Leymann et al. | 703/1 |
| 2002/0055868 A1 | 5/2002 | Dusevic et al. | |
| 2002/0059129 A1 | 5/2002 | Kemp, II et al. | |
| 2002/0133484 A1 | 9/2002 | Chau et al. | |
| 2002/0133516 A1 | 9/2002 | Davis et al. | |
| 2003/0126136 A1 | 7/2003 | Omoigui | |

FOREIGN PATENT DOCUMENTS

| | | |
|---|---|---|
| EP | 1 122 652 A1 | 8/2001 |
| EP | 1 122 652 A2 | 8/2001 |
| WO | WO 02/088944 A1 | 11/2002 |

OTHER PUBLICATIONS

Bergstrom, Scott, "Reusability Analysis of Reusable Objects" *AICC Management and Processes Subcommittee*, pp. 1-38 (2003).
Breunese, A.P.J., et al., "Libraries of Reusable Models: Theory and Application," *Simulation*, vol. 71, No. 1, pp. 1-12 (1998).
Delen, Dursun, et al., "An Integrated Toolkit for Enterprise Modeling and Analysis," *Proceedings of the 1999 Winter Simulation Conference*, pp. 289-297 (1999).

(Continued)

*Primary Examiner* — Apu Mofiz
*Assistant Examiner* — Chelcie Daye
(74) *Attorney, Agent, or Firm* — Brinks, Gilson & Lione

(57) ABSTRACT

A hierarchical framework for a library of software process management methodologies includes at a first level of hierarchy, a collection of activities that describe the process, wherein each activity requires the use of a unique skill set domain. At a second level of hierarchy, the framework includes a collection of tasks that describe the activity. At a third level of hierarchy, the framework includes a collection of steps that describe the task. For each methodology, a portion of the activities are categorized across a set of taxonomies common to a plurality of methodologies contained in the library such that the portion of activities is reusable for the plurality of methodologies.

12 Claims, 10 Drawing Sheets

(56) References Cited

OTHER PUBLICATIONS

Hofmann, Andreas, "Development of a Library for Reusable Workflow Objects," ACM SIGGROUP Bulletin, vol. 18, No. 1, pp. 18-23 (Apr. 1997).
International Search Report dated Jan. 26, 2005, for corresponding international application PCT/EP2004/008716.
Manolescu, Dragos, "Workflow Enactment with Continuation and Future Objects," *Proceedings on the 17th ACM Sigplan Conference on Object-Oriented Programming, Systems, Languages, and Applications*, pp. 40-51 (2002).
Schmid, Hans Albrecht, et al., "Business Procedures are not Represented Adequately in Business Applications and Frameworks!," *OOOPSLA '98 Business Object Workshop IV*, pp. 1-4 (1998).
Schmidt, Marc-Thomas, "Building Workflow Business Objects," *OOPSLA '98 Business Object Workshop IV*, pp. 1-12 (1998).
Vitharana, Padmal, et al., "Knowledge-Based Repository Scheme for Storing and Retrieving Business Components: A Theoretical Design and an Empirical Analysis," *IEEE Transactions On Software Engineering*, vol. 29, No. 7, pp. 649-664 (Jul. 2003).
Written Opinion, dated Jan. 26, 2005, for corresponding international application PCT/EP2004/008716.
United States Patent and Trademark Office Action dated Apr. 12, 2007 for copending U.S. Appl. No. 10/367,618.
United States Patent and Trademark Office Action dated Nov. 20, 2007 for copending U.S. Appl. No. 10/367,618.
Examination Report dated May 6, 2008 for European Patent Application No. 04710867.5.
Doerr, M. et al., Journal of Digital Information, "Towards a Core Ontology for Information Integration," Apr. 2003.
Krutchten, P., The Rational Edge, "What is the Rational Unified Process?", Jan. 2001.
Method/1: Guide for System Users, Version 9.5, Andersen Consulting, 1995.
White Paper, Documentum Worldwide Consulting White Paper: Content Management Services Methodology, Oct. 2002.
White Paper, Microsoft Frameworks: IT Occupation Taxonomy v.3.0, Feb. 2003.
White Paper, Microsoft Solutions Framework: MSF Team Model v. 3.1, Jun. 2002.
White Paper, Microsoft Solutions Framework: MSF Process Model v. 3.1, Jun. 2002.
White Paper, Rational Unified Process: Best Practices for Software Development Teams, Rational Software Corp., Nov. 2001.
Brody, Adam et al., "Integrating Disparate Knowledge Sources," Center for Strategic Technology Research, Accenture, Northbrook, Illinois, 1999 (6 pages). Article also appears in *Proceedings of the Second International Conference and Exposition on the Practical Application of Knowledge Management (PAKem '99)*.
Liongosari, Edy et al., "In Search of a New Generation of Knowledge Management Applications," Center for Strategic Technology Research, Accenture, Northbrook, Illinois, 1999 (4 pages). Article also appears in *ACM SIGGROUP Bulletin* (Jul. 1999).
United States Patent and Trademark Office Decision on Appeal dated Mar. 15, 2011 for corresponding U.S. Appl. No. 10/367,618.
Examiner's Second Report dated Nov. 2, 2010 for corresponding Australian Patent Application No. 2004263985.
Examiner's First Report dated Oct. 7, 2010 for corresponding Canadian Patent Application No. 2,534,666.
Vitharana et al., "Knowledge-Based Repository Scheme for Storing and Retrieving Business Components: A Theoretical Design and an Empirical Analysis," IEEE Transactions on Software Engineering, vol. 29, No. 7, Jul. 2003, pp. 649-664, ISSN: 0098-5589.
Delen et al., "An Integrated Toolkit for Enterprise Modeling and Analysis," Dec. 5, 1999, Winter Simulation Conference Proceedings, 1999, Phoenix, Arizona, USA, Piscataway, NJ, IEEE, pp. 289-297, ISBN: 0-7803-5780-9.
Breunese et al., "Libraries of Reusable Models: Theory and Application," Simulation, vol. 71, No. 1, 1998, ISSN: 0037-5497.
European Patent Office "Decision to Refuse a European Patent Application" dated Feb. 22, 2011 for corresponding European Patent Office Application No. 04 710 867.5.
Dursun Delen et al.; "*An Integrated Toolkit for Enterprise Modeling And Analysis*"; Knowledge Based Systems, Inc. (KBSI), College Station, TX 77840, (USA); Proceedings of the 1999 Winter Simulation Conference, P.A. Farrington, H.B. Nembhard, D.T. Sturrock, and G.W. Evans, eds.; pp. 289-297.
Notification of Reasons for Rejection dispatched Feb. 18, 2013 for pending Australian Patent Application No. 2011250439.
Patent Examination Report No. 2 dated Jul. 31, 2012 for pending Australian Patent Application No. 2011201054.
Office Action issued in corresponding Canadian Patent Application No. 2,534,666, mailed Apr. 26, 2012, 6 pages.
Examiner's Report No. 4 dated Jan. 8, 2013 for co-pending Australian Patent Application No. 2011200817.
Examiner's Report No. 2 dated Jun. 20, 2011 for co-pending Australian Patent Application No. 2011200817.

\* cited by examiner

METHODOLOGY FRAMEWORK AND DELIVERY VEHICLE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. The following notice applies to any software and data as described below and in the drawings hereto: Copyright© 2003, Accenture, All Rights Reserved.

BACKGROUND

1. Technical Field

The present invention relates generally to an improved method of organizing and presenting complex, detailed information stored in electronic form. The invention may find particular use in organizations that have a need to document repeatable processes to reflect its work. Typically, such organizations need to define processes that address a variety of related work domains, such as methodologies, and a desire to publish this information on a corporate intranet or the Internet.

2. Background Information

A methodology is a collection of information that explains how to plan, mobilize and/or execute a certain type of work. In other words, a methodology is a specific way of performing a multi-stage operation that implies precise deliverables and/or outcomes at the end of each stage. Deliverables are measurable results or outputs of a process. Thus, a methodology defines types of work processes in terms of measurable results. A well-defined methodology generally defines a business organization's best practices for accomplishing a given task and incorporates that organization's terminology. In this way, employees are able to refer to and integrate these best practices into their day-to-day performance of responsibilities. In order to take full advantage of this wealth of knowledge, methodologies must be accessible to various levels of employees throughout the organization. Publishing methodologies on an organization's intranet or securely on the Internet makes the methodologies instantly accessible to potentially any authorized individual throughout the world.

Three technical problems are generally encountered when defining and using a methodology across an organization. First, finding the appropriate content in a methodology using conventional browser interfaces is often difficult. Typically, methodologies are customized for specific business domains using interfaces and object labels that vary from one domain to another. For employees switching work roles from one domain to another or one project to another, not being familiar with the different interfaces and organization of information within a methodology makes it hard to locate the specific information that supports a given context. In organizations where this information is made accessible on the Internet, poorly designed interfaces result in an increased number of data files, or documents, consuming large amounts of storage space.

Second, traditional organizational models for accessing and displaying methodologies are inflexible. Typically, a methodology will be defined across multiple levels of hierarchically arranged data. There may be as many as six or more levels of detail hierarchically arranged in conventional methodologies. A typical user will need to drill through these levels to obtain the relevant information. The information at a given level may not be associated with the needs of users at a given role level, requiring greater navigation up and down through the hierarchy to locate pertinent information. As the information is published on the Internet, more levels of abstraction directly translates into increased network traffic and strained network resources.

Third, the data representative of highly integrated methodologies are difficult to maintain as a result of the high volume of explicit and implied relationships that exist among methodology data objects. If the data is spread over multiple levels of abstraction, the complexity involved in maintaining this information increases. Additionally, storage space is required to maintain each level. Thus, minimizing the levels of abstraction reduces the amount of data being stored, and keeping the data to a minimal level curtails the complexities involved in updating and supplementing an organization's methodology collections.

The present invention solves these technical problems by providing a new paradigm for storing, maintaining, delivering and transforming the data representative of the methodology.

BRIEF SUMMARY

In one embodiment, a hierarchical framework for a library of software process management methodologies includes at a first level of hierarchy, a collection of activities that describe the process, wherein each activity requires the use of a unique skill set domain. At a second level of hierarchy, the framework includes a collection of tasks that describe the activity. At a third level of hierarchy, the framework includes a collection of steps that describe the task. For each methodology, a portion of the activities are categorized across a set of taxonomies common to a plurality of methodologies contained in the library such that the portion of activities is reusable for the plurality of methodologies.

In another embodiment, a method is provided for mapping a knowledge base into a hierarchical framework to facilitate reusability of task objects between related work domains, wherein the objects contain descriptions of tasks for executing an information technology methodology. The method includes defining a set of taxonomies comprising members of a universe of activity objects for a methodology; organizing a set of task objects of singular granularity into object groups having in common a relation to one member of the taxonomy; and publishing onto an application server for access by a user through an electronic display a plurality of documents having a hierarchical linkage, wherein a highest level document displays the set of taxonomies with links to a set of second level documents, each second level document representing an activity object instantiation of a single member of the taxonomy, the second level document having links to a group of third-level documents, each third level document representing a task object instantiation of a single task object of singular granularity; wherein each methodology is mapped to a selection of a set of taxonomies, whereby an instantiation of an activity object from one methodology may be reused for another methodology.

In yet another embodiment, a method is provided for providing access to information and deliverable samples for executing an information technology methodology. The method comprises (i) displaying a first pictorial display of a planning chart comprising a plurality of stages and workstreams arranged in an orthogonal relationship; (ii) providing, embedded in the first pictorial display, a first link/code at an intersection of a stage and a workstream, the first link/code providing access to a second pictorial display; (iii) executing the first code to display a second pictorial display consisting of information contextually related to the stage and the workstream and comprising a plurality of objects having a parent-child relationship with the intersection; (iv) providing, embedded in the second pictorial display, a second link/code associated with each object, the object code providing access to a third pictorial display; and (v) executing the code to display the third pictorial display representative of a process for providing a single principle deliverable.

These and other embodiments and aspects of the invention are described with reference to the noted Figures and the below detailed description of the preferred embodiments.

DETAILED DESCRIPTION OF THE DRAWINGS AND THE PRESENTLY PREFERRED EMBODIMENTS

Figure 1:
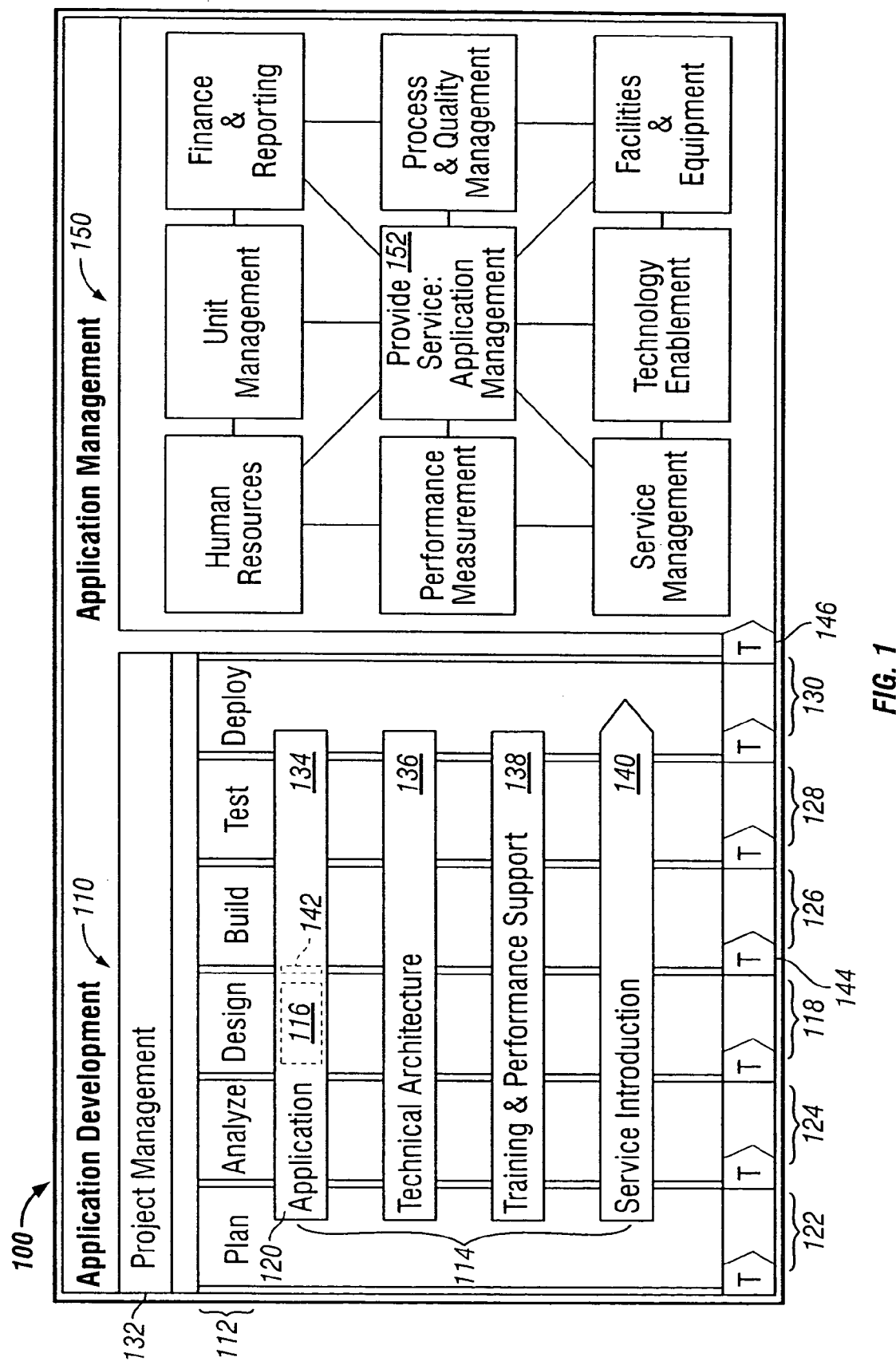
FIG. 1 is a representation of the integration of the top level planning charts for a development and an operations framework in accordance with the present invention.

The embodiments discussed in this application relate to two types of methodologies: development methodologies and operations methodologies. Referring to FIG. 1, a representative top level planning chart is depicted showing the overview of an application development methodology 110 transitioning into an application management operations methodology 150.

Development methodologies are collections of information that explain how to plan, mobilize and/or execute the development of a product, for example, application development. Operations methodologies are collections of information that explain how to plan, mobilize and/or execute business operations, for example, application management. It should be apparent to one of ordinary skill in the art that the principles discussed in relation to these embodiments are equally applicable to other types of methodologies without departing from the spirit and scope of the invention as claimed below.

In one embodiment, developing an application comprises a variety of processes that occur in a linear model, with set transition points that allow for multiple team members to transition seamlessly from one process to another, regardless of which team member is performing which process. On the other hand, operations methodologies are typically non-linear, and have no set transition points to dictate when to end one process and begin another. Rather, there exists a fluid relationship between areas of work that must be continually done over the life of an organization.

While these two types of methodologies differ in many respects from each other, in some respects they both have similar guiding principles. As such, by recognizing these principles, both methodologies may be defined in a simple, consistent, and flexible way. Additionally, any approach for defining these methodologies must be adaptable to many types of processes and areas of work. In one embodiment, these goals are accomplished by organizing a methodology into processes based on the skill sets required to complete the processes. Using this approach, these different types of methodologies can be defined with a data model common to all or most of the methodologies.

In addition to utilizing a common underlying data model, utilizing a similar interface to provide access to the methodologies also further the goals of simplicity, consistency, and flexibility. The common data model recognizes that the methodologies may be defined by a set of taxonomies that includes the members of the universe of activities included in the methodologies. For development methodologies that include a logical linear sequence of processes, the methodologies may be defined by two sets of taxonomies, a linear time-based taxonomy and a skill set-based taxonomy arranging the sub-processes by the skill sets required to perform the processes. In this latter approach, the activities are then defined by the intersection of one member of the linear time-based taxonomy with one member of the skill set-based taxonomy. Defining, organizing and categorizing the processes that make up the methodologies into these common activities allows the defined process sub-sets to be reused for defining or creating additional methodologies.

In one embodiment, the methodologies are presented across three levels of abstraction. Initially, a top-level planning chart is presented as an overview of the entire methodology. FIG. 1 provides exemplary top-level planning charts for a development methodology 110 and an operations methodology 150 for one embodiment of the present invention.

The Development Methodology Framework (DMF) 200 is structured as a matrix of stages 112 and workstreams 114. The vertical bars are the stages 112 of work within a project. In one embodiment, the intersections of the stages 112 and the workstreams 114 are embedded with code segments providing links to documents, described in more detail below. For example, the intersection 116 of the Design stage 118 and the Application workstream 120 links to another detailed display representing a discrete activity to be performed for this methodology. In this embodiment, there are six stages for a DMF 110 methodology. While these stages will be explained in regards to an application development methodology, it should be apparent to one of ordinary skill in the art they are equally applicable to any type of methodology using a linear model. Moreover, the stage definitions are exemplary and should not be construed as limiting in any way.

In the first stage in FIG. 1, plan 122, a blueprint for the project is defined and the project is organized. In other words, the business goals, scope, and high-level requirements of the project are determined. In the second stage, analyze 124, project requirements are gathered, identified, analyzed, and managed, for example, evaluating packaged software and technology infrastructure components. In the third stage, design 118, the applications, technical architecture, technical infrastructure, and application training materials are designed. In the fourth stage, build 126, the applications, technical architecture, technical infrastructure, and application training materials are developed. In the fifth stage, test 128, the components built by all workstreams are tested and the solution as a whole is validated with test users. In the final stage, deploy 130, the application, technical architecture, technical infrastructure, and training materials are rolled out to the organization.

The horizontal bars 114 of FIG. 1 represent workstreams defined as a domain or area of work. Workstreams 114 group together processes usually performed by a team of people with related skill sets. The processes are organized into a set of nine workstreams 114 that are considered generally applicable to the universe of development methodologies. Five are shown in FIG. 1, and are defined as follows: Project Management 132; Application 134; Technical Architecture 136; Training & Performance Support 138; and Service Introduction 140. The remaining four workstreams that are part of the library of standard workstreams, which are not shown, are Business Process; Organization; Facilities & Equipment; and Content. These labels and their accompanying definitions are intended to be illustrative, and should not be considered limiting in any way.

In addition to defining activities as groups of tasks that relate to performing work within a skill set or workstream related to a particular stage of the project, the methodology framework also provides transitions between activities and stages. A transition point represents an interface between two teams on a project. At a transition point, project deliverables (requirements, design documents, code, etc.) are transitioned from one team to another. The main purposes of the transition points are to ensure the quality of deliverables being transitioned and to foster effective communication between the "sending" and "receiving" teams to reduce project risks.

On the top level planning chart, a box 142 after a first activity, for example design application 116, may be embedded with a code segment representing a link to a detail display depicting information related to the process for transitioning between the activity of design application 116 and the next activity, build application. A summary display of the collective transition activity between one stage, for example design 118 and the next stage build 126, may also be embedded in the "T" labeled chevrons 144 at the bottom of the top level planning chart.

It is not necessary to have transitions between each and every activity, or for every workstream. For example, because the planning stage represents a common starting point requiring input from all work skill sets, this stage is embedded with a single link to a more detailed display, which depicts all the activities for this stage with a single transition point that splits into the four multiple workstreams 114 of linear activities. Likewise, at the conclusion of the test stage, it is preferred that each workstream's activities conclude with separate transition points that merge into a common single stage of a coordinated deployment of the application. Accordingly it is preferred that the Deploy stage be embedded with a single link to a more detailed display depicting all the activities for this stage not separated by workstream or skill set. Accordingly, it is preferred that a single transition link 146 is also provided between the deployment stage 130 or end of the Application Development methodology and the Application Management methodology 150.

As noted above, the Operations Management methodology represents the management of fluid non-linear activities to support the ongoing operations management of the deployed system. As such, the framework employed depicts a matrix of eight activities surrounding a single activity to indicate the supporting and core relationships between the activities. For example, FIG. 1 depicts the core activity to Provide Service: Application Management 152. The other eight supporting activities are organized to provide a common set of activities that universally support all core activities of different operations management methodologies. Thus, it is evident that the content from the supporting activities are reusable across many different operations management methodologies by swapping out the new core activity.

As with the Development Methodology top level planning chart 110, the Application Management Planning chart has a code embedded in the box depicting each activity, with the code providing an active link to a detailed display depicting the tasks required to perform the activity, as explained in more detail below.

Figure 2:
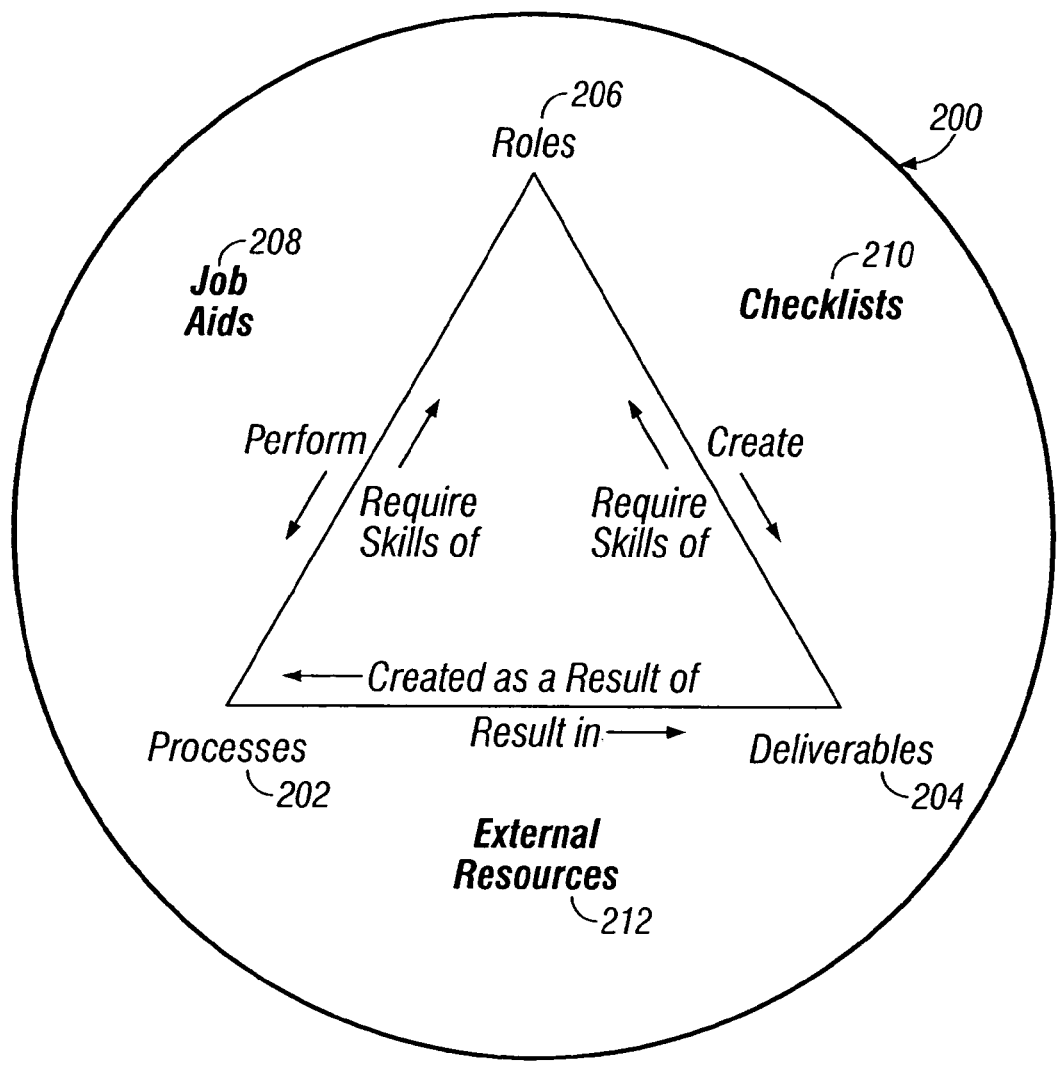
FIG. 2 is a schematic of the relationship between the primary and supplemental content of a methodology in accordance with the present invention.

Before describing the data model supporting the development of the framework, it may be best to describe how the core objects of the methodology fit with in the larger picture of the primary and supplemental elements within and linked to the methodology. Referring now to FIG. 2, a schematic representing the methodology 200 is depicted. At its core, the metadata model noted in detail below is divided into three key types of content in the methodology: Processes 202; Deliverables 204; and Roles 206. Processes 202 are defined as what a team member needs to do, and are preferably broken down hierarchically as activities, tasks and steps, as discussed in more detail below. Deliverables 204 are defined as what a team member needs to produce. Roles 206 are defined as job descriptions for a team member. These three content types all reference each other to form the foundation of the methodology, as shown in FIG. 2. Accordingly, the metadata model is designed to allow for flexible cross-referencing and linking between process objects that relate to associated roles and deliverables, and vice versa. Processes 202 require the skills of at least one role 206, and result in one or more deliverables 204. Various roles 206 perform processes 202 and create deliverables 204. Deliverables 204 require the skills of at least one role 206. Therefore, the model should allow one to view from the perspective of a specific role, the associated processes that role is involved in and the associated deliverable that role creates or supports. A likewise perspective is also provided from a specific point in the process or from a specific deliverable.

Three optional supplemental content types are also shown in FIG. 2. These supplemental content types provide additional information about the processes 202 and deliverables 204 for a team member performing a particular role 206. Job aids 208 provide a team member with information to assist the team member performing a role 206 to complete an element of the process 202. Checklists 210 provide a framework for a performer of a role 206 to create a deliverable 204. Finally, external resources 212, such as white papers or vendor manuals, may provide information about how the process 202 results in the deliverable 204.

In one embodiment, there are two levels of documents in the core methodology framework that describes the process elements: Activities and Tasks. Activities are large units of work with a single major outcome. For example, the Design Application activity 116 results in the Application Design deliverables. Activities are composed of tasks. Tasks are smaller units of work that are performed by one individual or team to create a single primary outcome. Tasks, in turn, are described as a sequence or compilation of steps.

A typical methodology may involve complex interactions among multiple teams; multiple releases; multiple people, processes, and technology elements; and multiple schedules. To address these complexities, the methodology data model has been designed to provide a presentation interface that supports personnel with different types of information needs, because different roles use methodologies in different ways. For most methodologies, there are two major types of roles: "Planners" and "Doers". These broad classifications provide a basic guideline for determining which information is most applicable to different types of personnel, based on the type of work they are responsible for.

Individuals responsible for structuring, estimating, and managing work on a program or project represent the "planner" role. Planners' activities occur whenever there is a need to evaluate a potential course of action, create a work plan, or manage a team. Information at the activity level is organized specifically to meet the needs of "planners." Each activity may contain the following information types commonly used by "planners:"

Planning charts that illustrate the relationships among the tasks of an activity. A planning chart can help "planners" gain an understanding of the overall structure and scope of work within an activity.

Objectives describe the purpose and intended outcomes of the activity. Objectives may be used for initial guidance regarding the relevance of a task.

As described above, deliverables are produced as a result of the work conducted in the activity. Planners can review the deliverables listed in this section as they are planning the work to ensure that they understand the desired result of an activity.

Roles define the responsibilities of a team member. This information is useful to a "planner" in staffing and balancing the workload of a project.

Relationships between workstreams explain the dependencies of an activity or workstream on other activities, and in turn what other activities need from your activity.

Summary-level statements and supporting narratives to help in managing, planning, and staffing the activity may also be provided. In one embodiment, these are called considerations. Considerations are used to document key issues, practical advice, and intangible factors related to the activity. This section can be helpful when considering how to structure the work, or how to manage work in progress.

Job aids or other resources that are related to the activity are also helpful to a "planner." Job aids can be used to help orient the "planner" to the nature of the work conducted, when it can be considered complete, and how it is structured.

As described above, one of the underpinnings for the methodology framework is to provide a three-tiered presentation layer specific to roles played in methodology process. "Doer" is a collective term for the personnel responsible for creating the business capability by executing the processes within the methodology. This is a collective term in that there are many different types of "doers." In one embodiment, "doers" can range from application designers, to test managers, to service management experts.

The distinction between a "Doer" and a "Planner" exists in terms of roles or frames of reference rather than actual personnel. In reality, an individual may plan work and do work as appropriate, and hence can be considered both a "planner" and a "doer." The methodology uses the concept of a "doer" to identify the methodology information required to execute the methodology process and complete the required deliverables to the desired level of quality.

The task planning chart provides "doers" with an overview of the scope of work that must be performed at the task level, and preferably the entire scope. Task planning charts can help define relationships among related actions. Task planning charts are divided into steps, which illustrate how work should be conducted, and may also point out iteration conditions. Task planning charts do not necessarily differ between development and operations methodologies, as every business process is a series of steps at its lowest level.

Typically, other information of importance to a "doer" will be provided to supplement a task planning chart. "Doers" consult this information to help them execute or do the work as these materials help them understand various aspects of that work. This information may include:

Deliverables, which represent information that is generated and captured during the execution of a methodology process. Deliverable and work object samples may optionally be included, and represent templates that can be used to structure the details of the work contained within a task. Understanding the structure of this information is critical to completing the work successfully.

Role information that define the responsibilities of a team member. This information is useful in understanding what expertise is needed to perform the work.

Step descriptions that provide an explanation of each step in a task's planning chart. Step descriptions may provide the "doer" with additional detail for completing each step of the task.

Job aids containing detailed information related to specific tasks within the methodology. Technique and guideline type job aids are particularly useful for "doers," as they include specific detailed explanations of how to conduct the work.

Summary-level statements and supporting narratives. In one embodiment, these are called key considerations. Understanding the planning considerations and the advice they contain is just as important for personnel executing the work as it is for those personnel planning the work.

Figure 3:
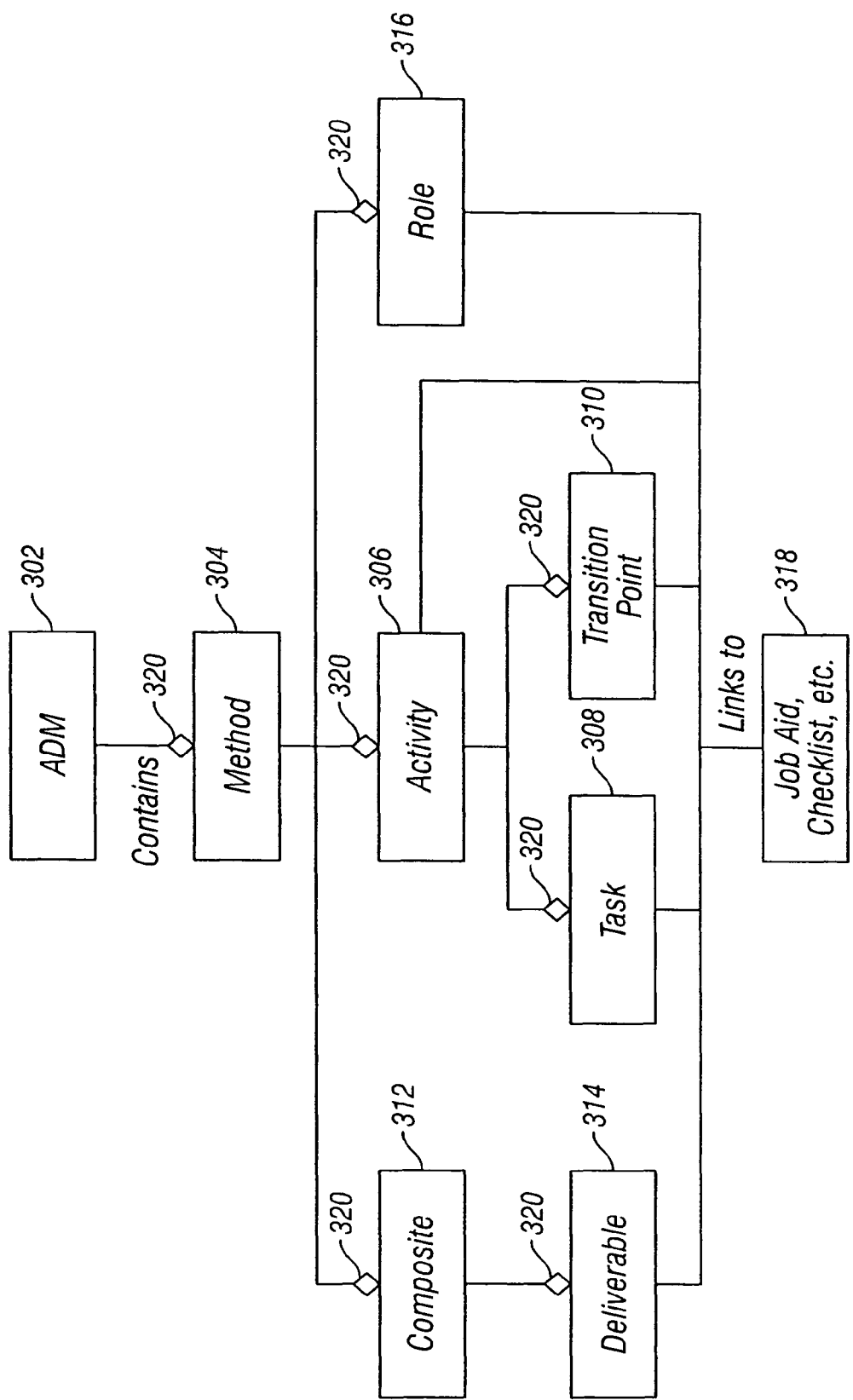
FIG. 3 is a schematic of a relational content model of a framework in accordance with the present invention.

Referring now to FIG. 3, a schematic of a relational content model for a library 302 of frameworks for several methodologies in accordance with the present invention is shown. In one embodiment, a methodology is defined as a collection of data objects, namely: methodology objects 304, activity objects 306, task objects 308, transition point objects 310, composite objects 312, deliverable objects 314, role objects 316, and supplemental objects 318. These objects are used to populate presentation templates, creating static documents that are made available to the end user, for example, on the Internet, such as described below with reference to the publishing environment depicted in FIG. 4.

Preferably, relationships between the data objects are defined in relationship objects. The relationship objects are used to validate the information in the data objects and define links between the static documents populated with the data of the data objects.

Referring again to FIG. 3, the methodology objects 304 are administrative objects used to organize the information that pertain to the particular methodology being defined. As will be described in more detail below, each activity object 306 used to define a particular methodology must belong to a methodology object 304.

Activity objects 306 define the processes necessary to produce the deliverables and outcomes for a specific workstream 114 during a specific stage 112 of a development methodology, or for a single activity of an operations methodology.

Task objects 308 define the individual actions required to complete the activity. Activity information is targeted to presentation to person performing a role 316 as a manager, and is divided among task objects 308. The data contained in an activity object 306 may include, for example, the name and ID information for the activity. A list of the principle objectives and outcomes for the activity, business considerations for planning, managing, staffing and successfully completing the activity, and estimating factors may also be defined in an activity object 306.

The data contained in an activity object 306 may also include links to objects describing the inputs and outputs of the activity, which may be deliverables or composites as discussed below. Preferably, the inputs and outputs are grouped by which deliverables are critical to the activity, also called primary inputs or outputs, and those which are useful but not needed, or secondary inputs or outputs. Optionally, the deliverable information may include a schematic of the deliverables for the activity, including their sequence and inter-relationships. Role information may also be contained in an activity object 306.

Other information stored in the activity object 306 may include the identification of the methodology to which the activity belongs, a description of the dependencies between the activity and activities in other workstreams, workflow schematics, and administrative information, such as version numbers and the like. Workflow schematics show the tasks for the activity, and may include their sequence and inter-relationships. The activity object 306 may also include a list of and links to additional references both within the methodology and external to it.

In one embodiment of a development methodology in accordance with the present invention, every activity object 306 must belong to a methodology object 304. Each activity object 306 has a parent-child relationship with at least one task object 308 and, with the exception of a few activity objects such as for project management, preferably with at least one transition point object 310.

Operations activity objects contain the same information as a development activity object. Additionally, each operations activity object has a parent-child relationship with at least one task. However, an operations activity object does not have a parent-child relationship with a transition point object 310. This is a reflection of the non-linear processes defined in an operations methodology.

As described above, tasks define the individual actions required to complete an activity. In one embodiment, this information is stored in task objects 308. Typically, a task object 308 may include, for example, the name and ID information for the task. Each task object 308 also includes information defining the steps for completing the task. A list of the principle objectives and outcomes for the task, business considerations for planning, managing, staffing and successfully completing the task, and estimating factors may also be defined in a task object 308.

The information contained in a task object 308 may include the inputs and outputs of the task, which may be deliverables or composites as discussed below. Preferably, the inputs and outputs are grouped by which deliverables are critical to the task, also called primary inputs or outputs, and those which are useful but not needed, or secondary inputs or outputs. Optionally, the deliverable information may include a schematic of the deliverables for the task, including their sequence and inter-relationships. Alternatively, the task object 308 may contain links to the composite 312 and deliverable 314 objects containing that information. Role information or links to relevant role objects 316 may also be contained in a task object 308.

Other information stored in a task object 308 may include the methodology to which the task belongs, workflow schematics, and administrative information, such as version numbers and the like. Workflow schematics show the process steps for the task, and may include their sequence and inter-relationships. The task object 308 may also include a list of and link to additional references both within the methodology and external to it.

Each task object 308 is a child of an activity object 306. Additionally, as noted above, relationships may be established between task objects 308 and composite objects 312, deliverable objects 314, role objects 316 and supplemental objects 318. Similar relationships may be contained in activity objects 306.

Because the tasks document displays do not link to lower level displays in the hierarchy and are typically defined as relating to a single outcome even though they may comprise multiple steps, they are referred to as having a singular granularity. Also, task objects do not have a relationship as a parent to a child object.

Transition points are analogous to a special kind of task dedicated to transitioning already validated composite or deliverables to the next team responsible for continuing the project. For example, Transition Application Design 142 (see FIG. 1) provides a user with information on what the design team needs to transition to the build team, and what the critical outcomes should be. In other words, a transition point represents an interface between two teams on a project. At a transition point, you transition project deliverables (requirements, design documents, code, etc.) from one team to another. The main purposes of the transition points are to ensure the quality of deliverables being transitioned and foster effective communication between the "sending" and "receiving" teams. Transition points are particularly useful where development occurs over multiple sites.

Transition point objects 310 define the information needed to transition a validated deliverable or composite from one team to another. In one embodiment, transition point objects 310 may include the name and ID information for the transition point. Each transition point object 310 also includes a description of how to perform the process steps of the transition point. A list of the principle objectives and outcomes for the transition point, business considerations for planning, managing, staffing and successfully completing the task, and estimating factors may also be defined in a transition point object 310.

The information contained in a transition point object 310 may include the entry criteria and exit criteria of the transition point. Each transition point object 310 may also include a list of the deliverables that are to be transitioned during the transition point. Role information may also be contained in a task object 310.

A composite is a group of related deliverables that are referenced as a single item. For example, composite A may include deliverables B, C, and D. Each composite A may contain zero, one, or many instances of each item B, C or D. Collectively, however, all instances of composite A serve one purpose in relation to the task or activity being performed.

Composite information is defined in composite objects 312. The composite object 312 typically contains a name and ID for the object. Composite objects 312 may contain a description of the composite, including its purpose, a list of deliverables associated with the composite, and role information. In one embodiment, the composite objects 312 include information explaining who uses the composite and for what purposes. The number of instances of the composite may also be stored in a composite object 312. The composite object 312 may define a list of the tasks that create the composite and which tasks use the composite. Other information, such as a list of job aids, checklists, reference materials and external resources may optionally be defined in a composite object 312.

As explained above, deliverables are measurable results or outputs of a process. Deliverable objects 314 contain definitions of the deliverable associated with a task object 308. The deliverable object 314 typically contains a name and ID for the object. Deliverable objects 314 may contain a description of the deliverable, including its purpose, a list of composites associated with the deliverable, if any, and role information. Optionally, deliverable objects 314 may contain links to templates and/or samples of the deliverable being defined. The templates and samples can be internal or external to the methodology. Preferably, any template associated with a deliverable object should include descriptions of the fields and sections of the template, as well as guidelines for completing the deliverable. Deliverable objects 314 may also include the number of instances of the deliverable, and information explaining who uses the composite and for what purposes. In one embodiment, the deliverable object 314 contains a list of the processes that create, update and/or use the deliverable, and links thereto. Other information, such as a list of job aids, checklists, reference materials and external resources may optionally be defined in a deliverable object 314, along with associated links.

Roles are the skill sets needed to complete a task. A person on a team may have one or more roles on the project. Similarly, more than one person on a team may share a role. In one embodiment, there are two types of roles in the methodology. Responsible roles are the roles that are primarily responsible for completing a task or deliverable, while participating roles are the roles that assist in completing a task or deliverable by reviewing the work or providing the expertise.

Roles are defined in role objects 316. Typically, a role object will include a name and/or ID. In one embodiment, role objects 316 include a list of the responsibilities for the entire methodology of the role being defined, and a list of the abilities expected for the role. As explained above, task objects 308 may include role information and/or links thereto. Inversely, role objects 316 may include a list of the tasks associated with the role and/or links thereto. In one embodiment, this list is divided into the tasks wherein the role is a responsible role and tasks wherein the role is a participating role. Similarly, role objects 316 may include a list of and links to related deliverables (or composites). This list may also be divided into deliverables (or composites) the role is responsible for, and those deliverables that the role is participating in. Other information, such as a list of job aids, checklists, reference materials and external resources may optionally be defined in a role object 316.

Supplemental objects 318 provide links to information regarding additional assistance for users in the form of job aids, checklists, reference materials, and external resources. Job aids provide additional guidance for completing a task or deliverable. In one embodiment, there are three types of job aids. Overview job aids provide a description of key concepts and background information. Guideline job aids provide specific information on issues, considerations, and approaches for completing a task. Technique job aids provide specific information on a specific approach or method of achieving a result.

Checklists provide tools for quick quality checks at key points in the process. In one embodiment, each checklist comes with an attachment, allowing a user to easily download a copy of a checklist, customize it as necessary for a project, complete it, and store it with project deliverables.

Reference materials provide contextual information and recommendations for using a particular methodology. For example, these reference materials can be used to help develop presentations for customers or training for project team members. In one embodiment, reference materials may include schematics overview for an entire workstream, or information detailing the dependencies between workstreams. External references are links to additional resources outside this methodology, including references to internal databases, web sites, book descriptions, and other methodologies.

In the relational data model, the diamond icon 320 represents the "contains" relationship that is also a parent-child relationship between objects. The icon 320 represents the hierarchical relationship between objects in the framework. As may be recognized in the data model, the simplified hierarchical structure provides many technical advantages to the present invention over prior complex data models representing methodologies having six or more levels of hierarchy. This data model provides significant advantage in the technical development and publishing environment where the relational data base model and content of the methodology are maintained and published as static documents accessible, for example, though a web browser on a corporate intranet.

Figure 4:
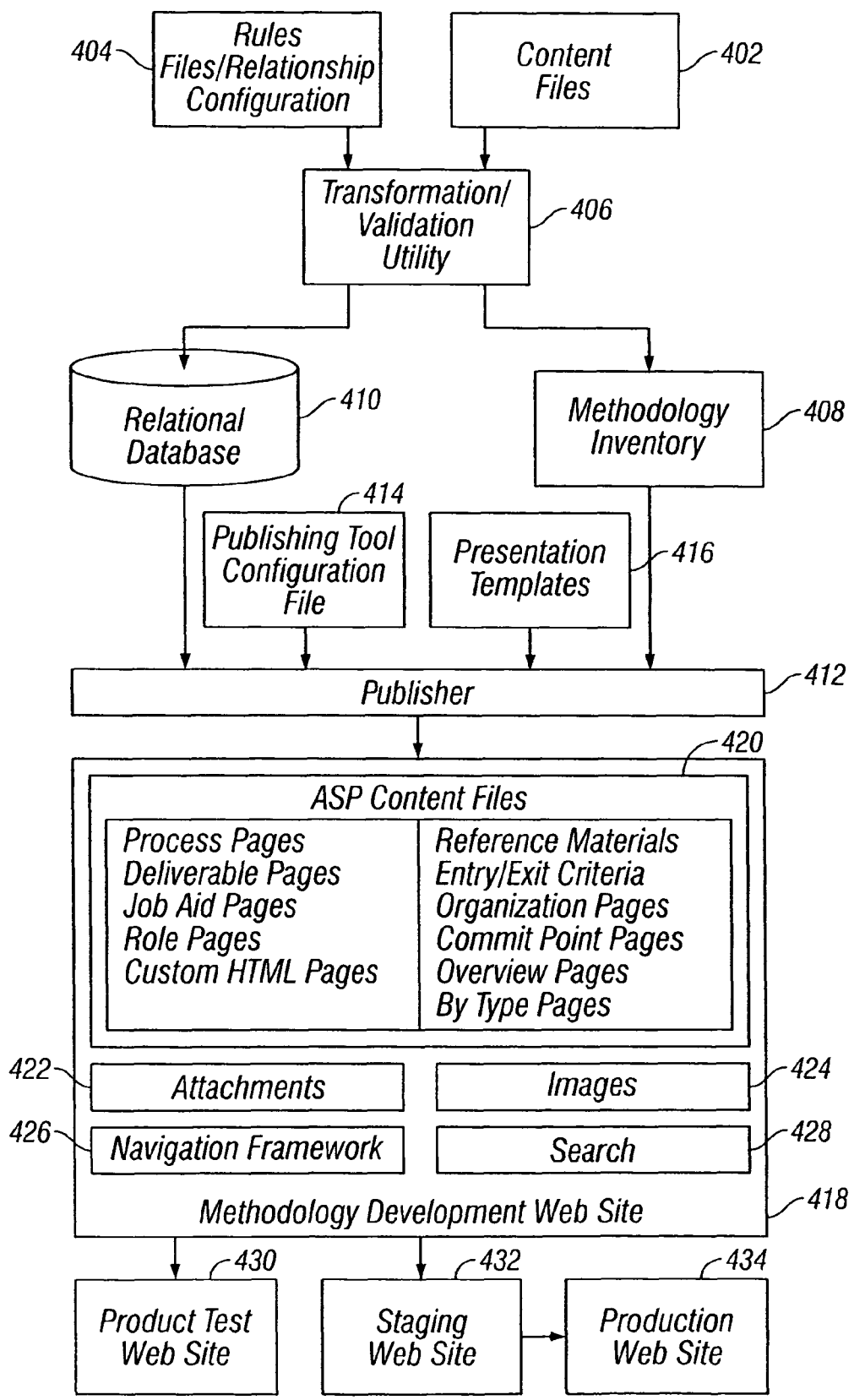
FIG. 4 is a diagram representative of the development architecture and the data flow of one embodiment of a methodology publishing environment for a methodology delivery infrastructure in accordance with the present invention.

Referring now to FIG. 4, the architecture for a development and publishing environment 400 of a methodology delivery infrastructure is shown. This architecture is more fully disclosed in commonly-owned, co-pending U.S. patent application Ser. No. 10/367,618, filed Feb. 14, 2003, which is incorporated by reference herein.

In one embodiment, a development environment 400 is provided for creating static web pages representative of a metadata model created for defining a methodology. As stated earlier, a methodology is a collection of information that explains how to plan, mobilize and execute a certain type of work. Defining a methodology typically requires each type of work to be decomposed into elements. In one embodiment, elements are defined as objects. As discussed above, objects can have various types. In the development architecture 400 of FIG. 4, a plurality of content files 402 are provided. Each content file 402 is representative of an object/element of the particular methodology being defined. Additionally, the content files 402 are representative of a particular instance of each type of work. Each content file 402 defines an object containing an object type at least one object property and at least one explicit relationship. Each object is representative of a particular instance of the element of the type of work being defined in the current methodology. The object properties define variables associated with an object, while the explicit relationships define links between particular objects. It should be noted that the explicit relationships defined in the content files 402 should not be confused with the explicit relationship definitions discussed below.

In addition to the content files 402, a plurality of rule files 404 are also provided. The rule files 404 define relationships generally. Relationships are defined by properties and explicit relationship definitions. The relationship properties define variables associated with the relationship being defined. The explicit relationship definitions can define how object types interact with one another generally. In one embodiment, these interactions are defined in terms of actions, or relationship operations, that are to be performed when certain conditions are satisfied. The conditions can be based on the properties associated with the relationship being defined, or can incorporate static variables, also known as constants. A variety of conditions are contemplated by the present invention. For example, one condition may be satisfied if two distinct object types are explicitly defined in the content files 402 to have a particular relationship. Additionally, actions can be dependent on multiple explicit relationships defined in the content files 402 or prefaced on certain property values. Referring also to FIG. 4, in one embodiment, the rule files 404 are provided within a hierarchical framework described in more detail below. Preferably, the content files 402 and rule files 404 are formatted in extensible markup language (XML).

Because of the common taxonomies used to define the activities and hence the tasks comprising the activities, the content files 402 and rule files from one methodology already created may be copied and reused for new methodologies being created. Preferably, the content of complete workstreams of activity and task objects may be copied and reused with little or no modification. Nonetheless, relationships with other new content may need to be defined to integrate the reused content into the new methodology.

Once all the content files 402 and rule files 404 are defined for a particular methodology, the architecture 400 of the present invention validates the information in the content files 402 with the relationship definitions of the rule files 404. In the embodiment of FIG. 4, a transformation/validation utility 406 is provided. The transformation/validation utility 406 reads the information in the content files 402 and verifies the information is proper based on the explicit rule definitions provided in the rule files 404. For example, assume a content file 402 defines an object A of type B having an explicit relationship of relationship type C with object D. Further assume that object D is of a type E. The transformation/validation utility 406 will read this information from the content file 402. The validation utility 406 then determines if objects of type B can have a relationship of type C with an object of type E by verifying the relationships defined in the rules file 404. Once verified, the transformation/validation utility 406 generates a link between the two objects to reflect the explicit relationship defined by the content file 402. Object properties may also be verified. For example, if object type C is invalid, the object property classifying object B as a type C object is incorrect. Additionally, implicit relationships and links are also generated by the transformation/validation utility 406. For example, an implicit relationship from object D to object B is also generated by the transformation/validation utility 406, as discussed below. It should be appreciated that more complex explicit relationships and implicit relationships are contemplated by the current invention.

In one embodiment, the transformation/validation utility 106 represents the explicit and implicit relationships in the form of a Structured Query Language (SQL) command. As known in the art, SQL is a language used to interrogate and process data in a relational database. SQL commands can be used to interactively work with a database or can be embedded within a programming interface to a database. In one embodiment, the SQL commands are generated by the transformation/validation utility 406 and stored in the rule files 404. The transformation/validation utility 406 performs a validation/transformation on each object described in the content files 402.

Once the validation and SQL generation process is completed, the transformation/validation utility 406 extracts the data contained in the content files and transforms the data into two components. First, a methodology inventory file 408 is created, listing each object defined in the content files 402. Next, the object properties, explicit relationships, implicit relationships and links are entered into a relational database 410.

A publisher utility 412 is provided with an optional configuration file 414 to create static Internet documents, in a known manner. In the embodiment of FIG. 4, a plurality of presentation templates 416 are provided to define a format for the Internet documents. As known in the art, the publisher utility 412 is adapted to access the relational database 410 and populate various fields in the presentation templates 416 incorporating the various relationships reflected in the database. In this way, the present invention is able to ensure maximum accessibility to a particular methodology, while maintaining enough flexibility to quickly adapt to changes in the methodology's content.

Referring also to FIG. 4, the publisher utility 412 creates static Internet documents by populating fields in presentation templates 416 with data contained in a relational database 410. The publishing utility 412 writes individual files and organizes these files into a methodology development web site 418. The methodology development web site 418 is organized into five categories of document types. A collection of Active Server Pages (ASP) content files 420 are provided. This collection contains the content pages for describing methodologies through the multiple interfaces described below. These pages can describe processes, deliverables, job aids, roles, reference materials, entry/exit criteria, organizations, commit points, overviews, lists ordered by type, or other custom HTML pages. Any attachments or images embedded in the content pages 420 are organized into the attachments collection 422 or images collection 424, respectively. All documents used to define and implement the navigation structure defined below in reference to the multiple user interfaces are organized into a navigational framework collection 426. Finally, the search collection 428 contains the documents and tools required to perform the search functions described below in reference to the multiple user interfaces.

Optionally, the methodology development web site can be published using a standard publishing tool, such as Front Page Publisher provided by Microsoft Corporation of Redmond, Wash., to create the product test 430 and staging 432 web sites. As known in the art, product test 430 and staging 432 web sites allow developers an opportunity to find errors in the pages and/or content of the documents. Once the testing and staging process is complete, the production version of methodology development web site 434 is published to the methods production repository (not shown). The methodologies production repository is associated with an application server to allow authorized users access to methodologies throughout the corporate intranets and the Internet.

Figure 5:
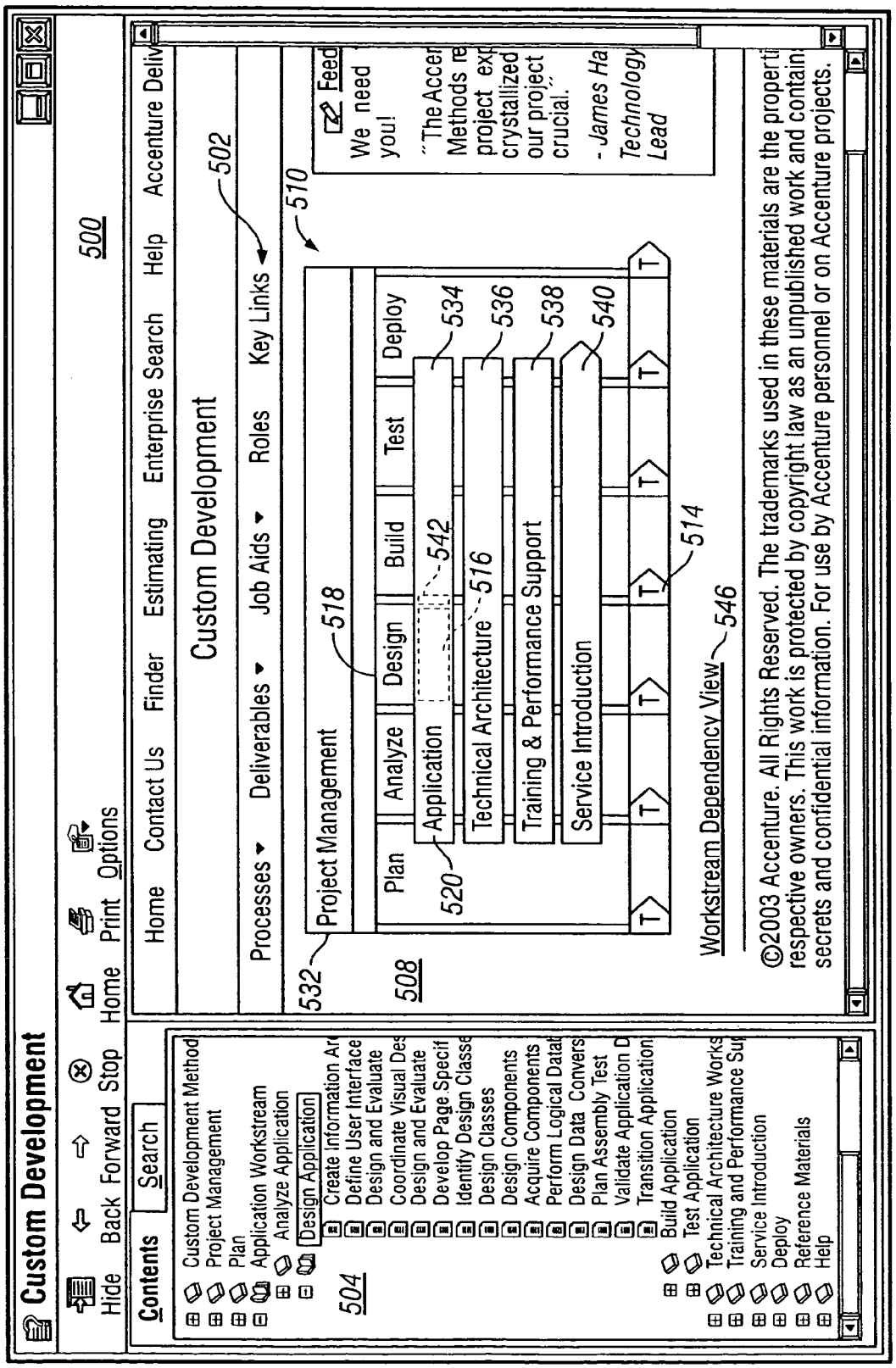
FIG. 5 is a representative screen shot of a top-level planning chart view for presenting a development methodology in accordance with the present invention.
Figure 6:
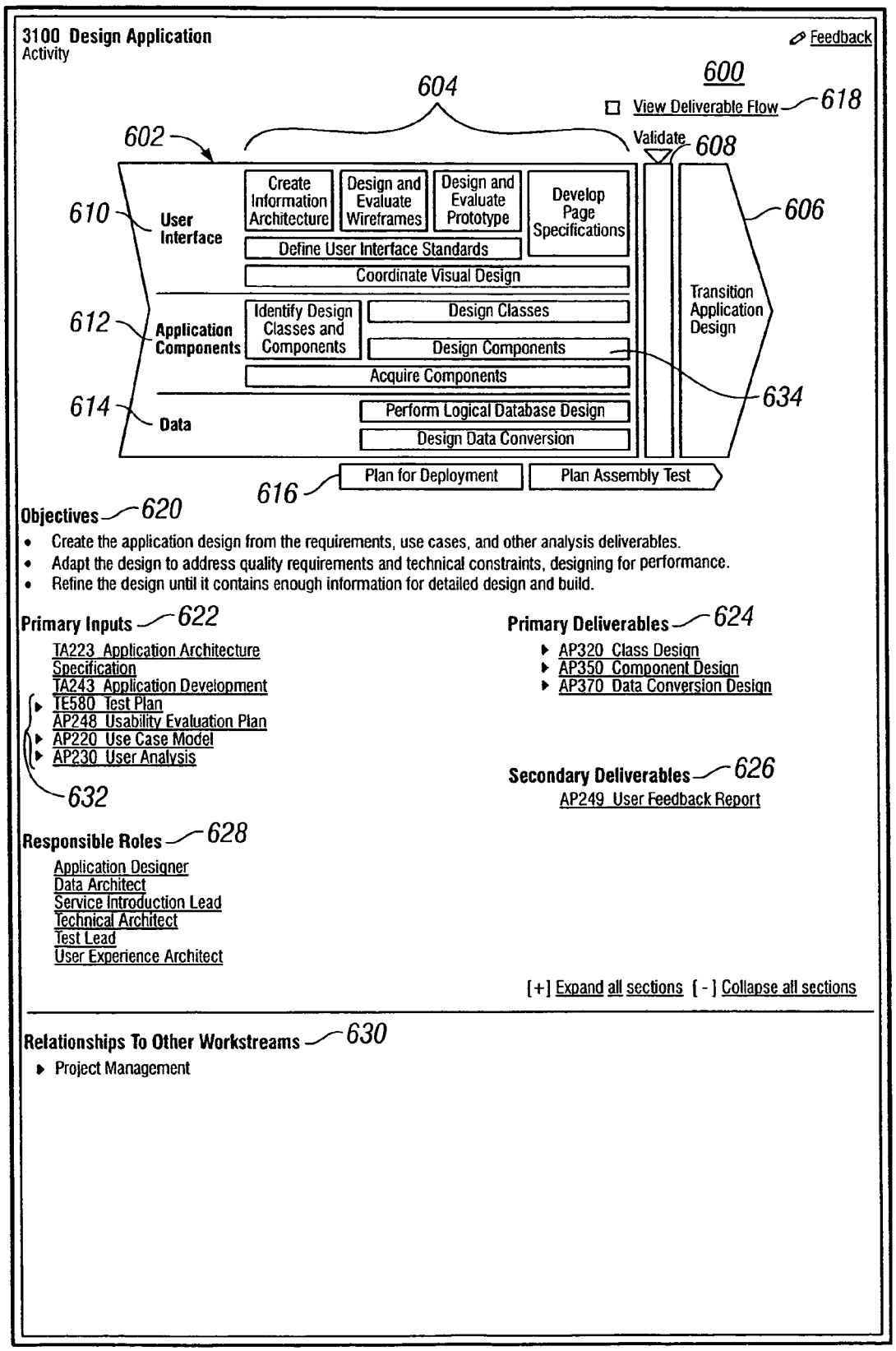
FIG. 6 is a representative screen shot of an activity view for presenting a development methodology in accordance with the embodiment of FIG. 1.
Figure 7:
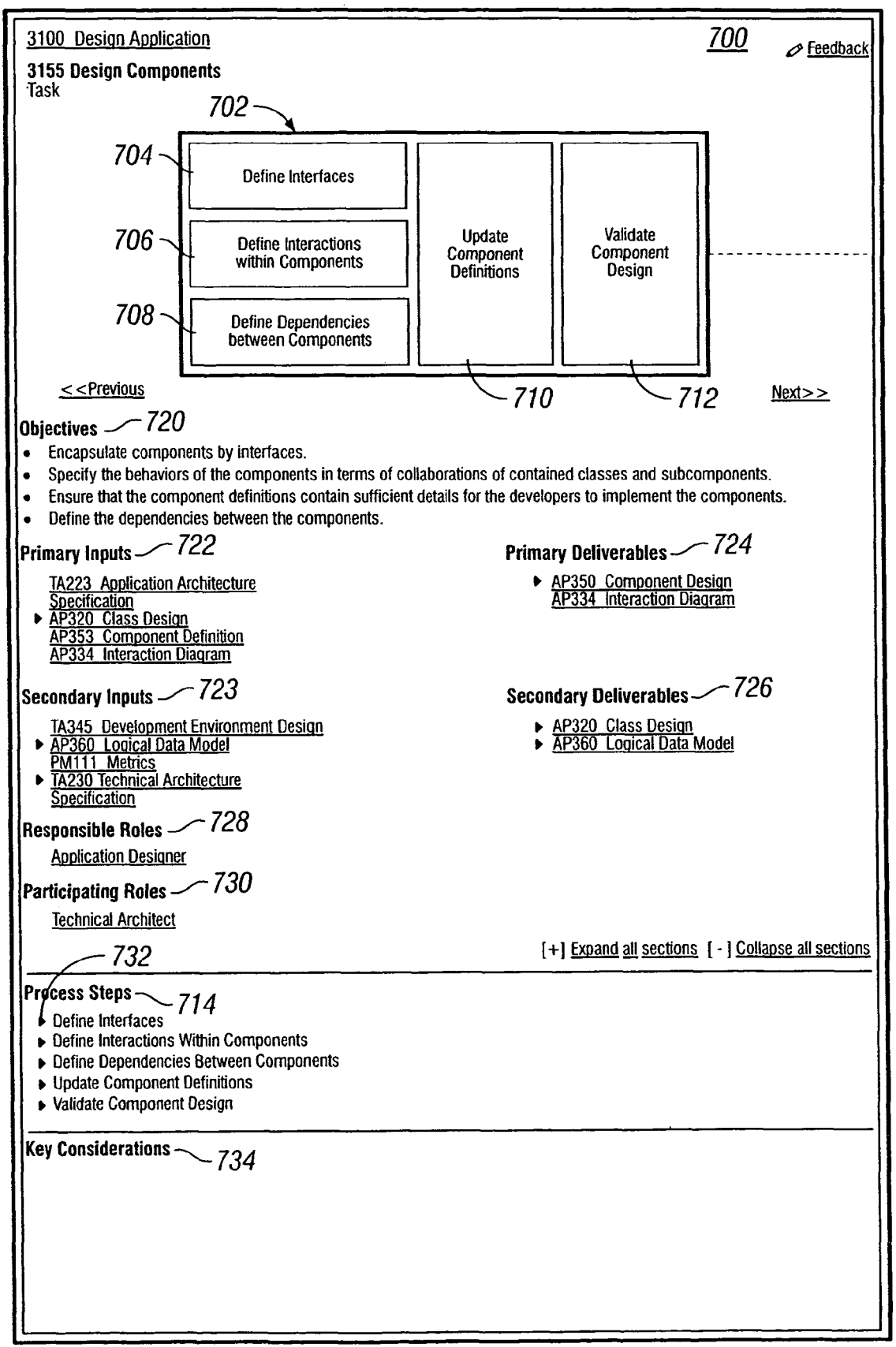
FIG. 7 is a representative screen shot of a task view for presenting a development methodology in accordance with the embodiment of FIG. 1.

One embodiment of the three-tiered hierarchical user interface for a development methodology is depicted in FIGS. 5-7. This embodiment depicts representative screen shots for a methodology entitled "Custom Development." The interface for the methodology is shown within a browser interface 500 referred to as a "Methods Browser" 500 which is described in more detail in commonly-owned, co-pending U.S. patent application Ser. No. 10/367,618, filed Feb. 14, 2003, which is incorporated by reference herein. This interface provides drop down menus 502 to access pertinent detail information within the methodology. Also, this interface provides a hierarchical tree table of contents 504, or a text search 506 to access the methodology content. The selected methodology content is displayed within the active browser window 508.

FIG. 5 depicts the top level planning chart 510 of the methodology within the active window 508. This workstream chart is similar to the embodiment shown in FIG. 1, and like items are referenced with numerals having similar tens and ones digits preceded with a 500 series. The planning chart 510 has embedded within it links or codes executable to call up a display of a document informational related to the subject to which the area where the links are embedded.

For example, the intersection 516 of the Design stage 518 and the Application workstream 520 is embedded with a code that links to the Design Application Activity. The hierarchical relationship of this Activity with the Workstream and the underlying tasks is also depicted within the Table of Contents tree 504. Clicking on the intersection 516 calls up the display of the Design Application document 600 as shown in FIG. 6.

The highest level of the development framework 510, or the top-level planning chart, is shown as a simple matrix. In the embodiment of FIG. 5, it is not meant to show accurate time dependencies between the different workstreams. A link is provided to another document that shows a graphical depiction of the workstream dependency view 546 of the same activities represented in the top level planning chart 510. For example, all three analyze activities (Analyze Application, Analyze Technical Architecture, and Analyze Training and Performance Support) do not happen simultaneously; each workstream has interrelated dependencies that require some activities to precede others. However, they are all initiated from the Plan activity. A view of the dependencies in a more accurate time scale may be viewed in other graphic images accessible through the framework interface, for example, by providing a reference material document. Similarly, the simplicity of the framework does not graphically depict the likely iterations that will take place within the project. Iteration planning is done as part of the Project Management 532 workstream, as known to one of ordinary skill in the art.

The project management workstream 532 may include such processes as defining the project work effort and resources; managing the risks, issues, quality, scope, and finances for the project; creating and maintaining project standards; control project work; measuring progress; and reporting status. Project management is shown separately in FIGS. 1 and 5 because it spans the entire life cycle of the project, and has many of the same activities performed on an iterative nature. The application workstream 534 may include processes relating to the development of the systems required to support the solution. This may include the user interface, content, business logic, and data. The technical architecture workstream 536 contains processes relating to the development of the technical architecture required for deployment of the solution. These processes may include developing the execution, development environment, and operations environments for the project. The training and performance support workstream 538 may include those processes necessary to develop the educational, performance support, and communication materials needed to support the use of the solution. The service introduction workstream 540 may include processes needed to validate the operability of the application while determining what the application management unit needs to do to be ready to support the application.

In the preferred embodiment, clicking on the intersection 516 of "Design" and "Application" opens the Design Application activity document 600 within the active window 508 of the Methods Browser 500. For illustrative purposes, an exemplary development activity document 600 is shown in FIG. 6 separate from the browser interface. An activity planning chart 602 is provided. The planning chart 602 contains a plurality of tasks 604 graphically depicted as boxes on the chart. Each box has a link or code embedded within the box to link to the display for the document describing details of the selected task. In this case, the tasks have been divided into sub-workstreams 610, 612 and 614 based on the specialized skill sets required to perform the tasks.

Additionally, a validation gateway 608 is depicted in the planning chart 602. Finally, a transition point 606 is shown in the planning chart. Preferably, colors are used to designate the roles associated with the activities of the planning chart 408. For example, a grey box 616 indicates tasks that involve members of this team but are the responsibility of another team. Plan for Deployment 616 leverages team members performing the role of application designers, but is the responsibility of the Deployment team.

Preferably, a link 618 is provided in this activity document with an alternate graphical image showing the deliverable flow. Similar narrative content is provided in the alternate document, except that instead of tasks 604 in the planning chart, the chart includes the deliverable provided by the activity.

Other information may also be included in the activity document 600, which has been edited to better fit on a single sheet, and thus does not show all the information associated with the document. This other information includes objectives 620, which provides a list of the principle objectives and outcomes for the activity. The inputs and outputs of the activity, which may be deliverables or composites, may also be included. Primary inputs 622 provide a list of the most important inputs to the activity. Optionally, a list of secondary inputs (not shown) may also be provided. Similarly, primary deliverables 624 and secondary deliverables 626 information may be provided. Responsible role information 628 may also be displayed for the activity. Information regarding the activity's relationships with other workstreams 630 may be provided. Optionally, planning, staffing, managing and additional considerations (not shown) may be incorporated into the document 600. The listed information may be active hypertext to provide links to documents containing more detailed information. Also, the references may comprise subcomponents that may be shown by expanding the listing by clicking the expand icons 632.

Finally, the activity document 600 may include links to supplemental information. In one embodiment, these are titled "See Also." The See Also section may provide links to the supplemental content external to the methodology content. As described above, this supplemental content includes job aids, checklists, related processes and reference materials. Optionally, links to external resources outside the corporate intranet may also be provided.

Clicking on any of the tasks 604 on the activity planning chart 602 opens a task document, the lowest process level document in the methodology. An exemplary task document 700 is shown in FIG. 7. For example, by clicking on the task box 634 labeled "Design Components" the corresponding task document 700 is displayed within the active browser window 508. Within the task document 700 a task planning chart 702 is provided. As described above, the task planning chart 702 contains a plurality of process steps depicted as boxes 704 through 712. Unlike the top level planning chart and the activity planning chart at the first and second levels of the framework hierarchy, the boxes depicting the steps are not linked to lower level documents. Rather, the details of each step are described at the bottom of the document under the title "Process Steps" 714. The individual descriptions of the steps can be viewed by clicking the expand icon 732 by each step label.

Other information may also be included in the task document 700. Objectives 720 provide a list of the principle objectives and outcomes for the task. The inputs and outputs of the task, which may be deliverables or composites, may also be included. Primary inputs 722 provide a list of the most important inputs to the activity. Optionally, a list of secondary inputs 723 may also be provided. Similarly, primary 724 and secondary 726 deliverable information may be provided. Responsible role information 728 may also be displayed for the activity. Optionally, participating role information 730 may also be provided in the task document 700. Optionally, key considerations 734 for the task may be displayed.

Finally, the task document 700 may include links to supplemental information. In one embodiment, these are a titled "See Also" section which may provide links to checklists and external resources may also be provided. Links to other types of external resources may also be incorporated into the task document.

Figure 8:
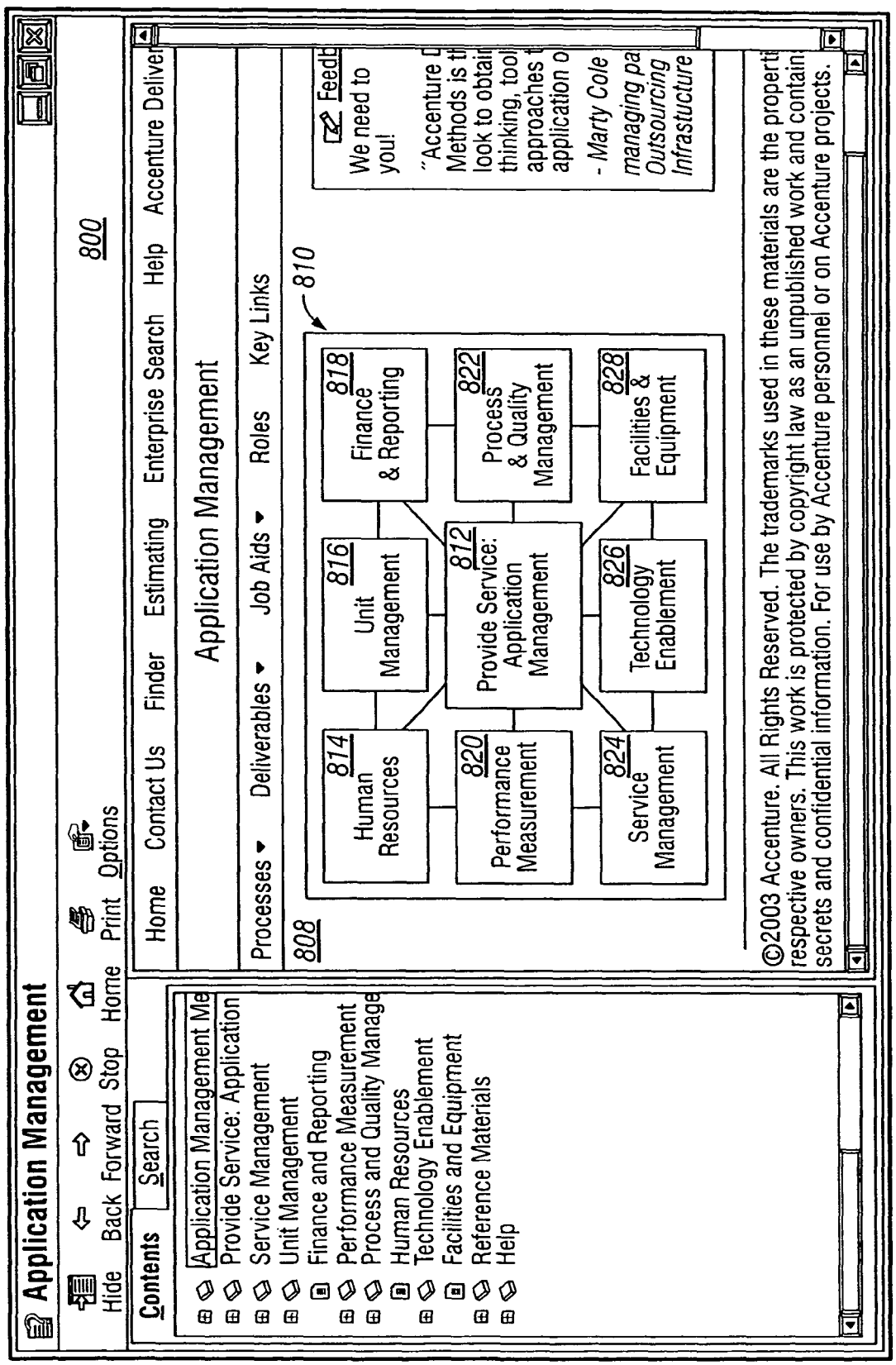
FIG. 8 is a representative screen shot of a top-level planning chart for presenting an operations management methodology in accordance with the present invention.
Figure 9:
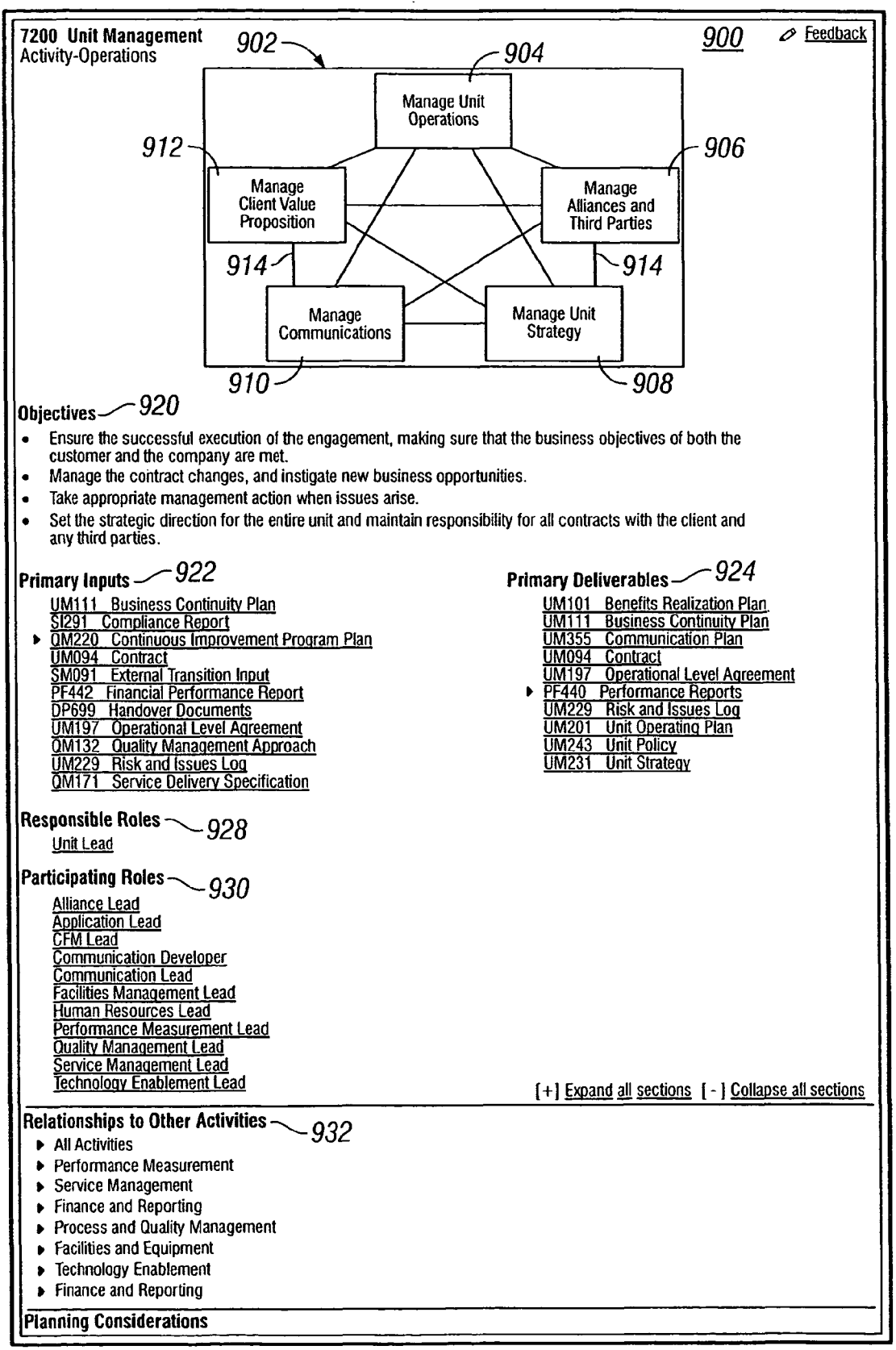
FIG. 9 is a representative screen shot of an activity view for presenting an operations management methodology in accordance with the present invention.
Figure 10:
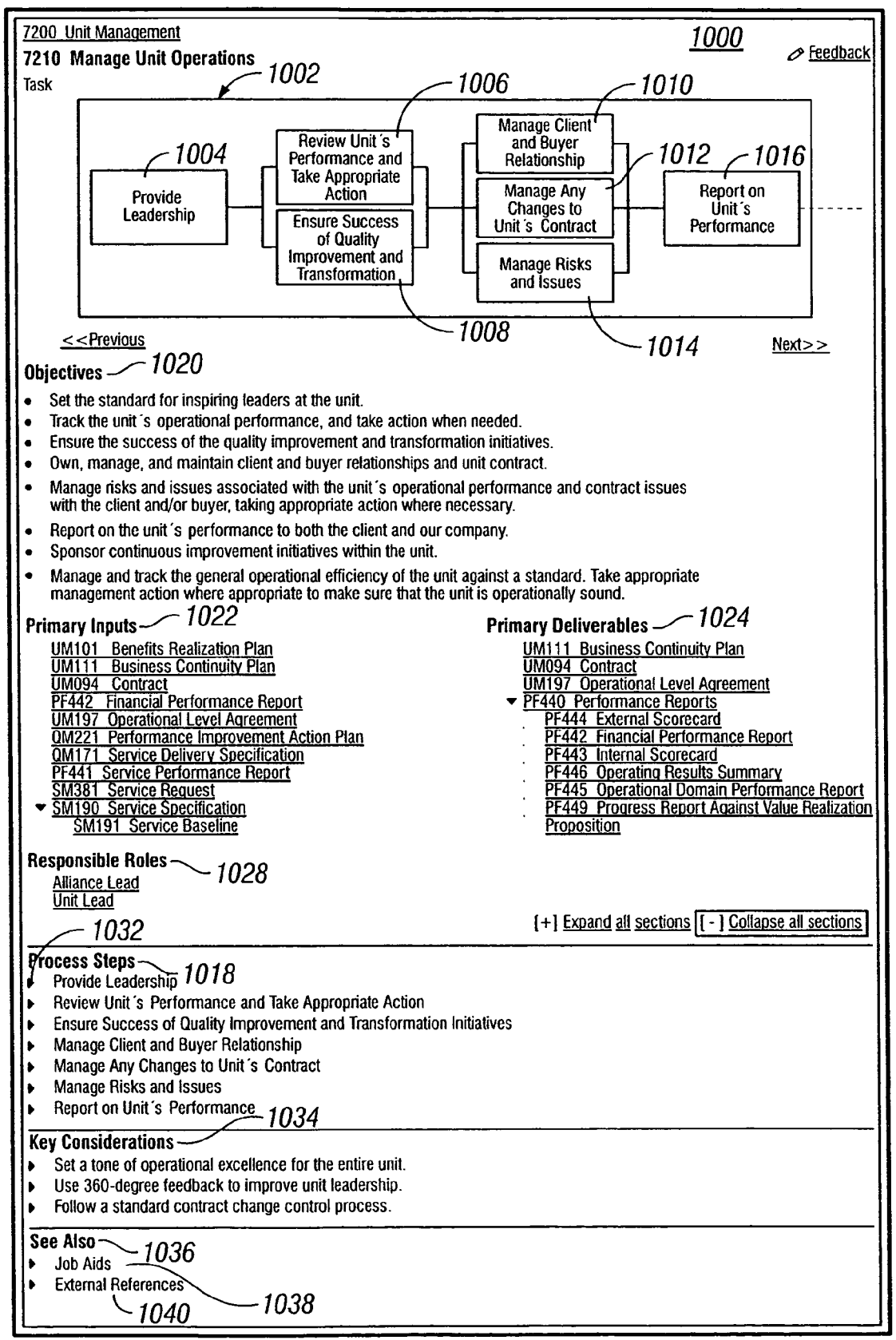
FIG. 10 is a representative screen shot of a task view for presenting an operations management methodology in accordance with the present invention.

One embodiment of a three-tiered hierarchical user interface for an operations methodology is depicted in FIGS. 8-10. FIG. 8 shows one embodiment of an operations management top-level planning chart 810 structured as a grid of interrelated activities as shown. These activities include a single core activity 812 and eight supporting activities. Preferably, the supporting activities are common to other Operations Management Methodologies. The planning chart 810 for "Application Management" is displayed within the active window 808 of the methods browser interface 800. The planning chart 810 comprises a core service activity—Provide Service 812, and eight common supporting activities: Human Resources 814, Unit Management 816, Finance & Reporting 818, Performance Measurement 820, Process & Quality Management 822, Service Management 824, Technology Enablement 826, and Facilities & Equipment 828. Provide Service 812 includes the tasks and deliverables needed to provide continuing support of an organization's portfolio of applications, including problem resolution, ongoing maintenance, and enhancements. This activity is the central focus of the operations management methodology.

Human Resources 814 includes guidance for creating and sustaining an operating workforce that is appropriately skilled and enabled, adaptable to changing work environments, and satisfied with career and employment opportunities. Task level detail and deliverables are available in referenced Human Resources knowledge sources.

Unit Management 816 includes the tasks and deliverables required for the operation of the unit, enabling the unit to meet the business objectives of the customer and the company. This includes overseeing contracts with the client and third party providers, setting policies and strategic direction, and taking appropriate management action where necessary.

Finance and Reporting 818 includes guidance for executing financial operations and reporting for a unit. Task level detail and deliverables are available in referenced financial management knowledge stores.

Performance Measurement 820 includes the tasks and deliverables needed to ensure that all of the functions of the unit have information about the unit's performance and can take appropriate management action to correct any identified shortcomings.

Process and Quality Management 822 includes the tasks and deliverables needed to establish a quality management approach for the unit that meets the expectations of the unit's stakeholders, implement the processes and procedures necessary to carry out the unit's functions, and identify and implement improvement.

Service Management 824 includes the tasks and deliverables needed to manage the service interfaces between the customer and the unit, enabling the unit to define, manage, measure, and meet the customer's service expectations and achieve the agreed-on service levels.

Technology Enablement 826 includes the tasks and deliverables needed for the provisioning and maintenance of services such as voice and data communications, software and hardware, technology equipment inventory, and software licenses for the engagement.

Facilities and Equipment 828 includes guidance for provisioning and maintaining the facilities and equipment for the unit, from buildings, desks, chairs, and lights, to air conditioning and office supplies. Task level detail and deliverables are available in referenced knowledge sources.

Embedded in the area of each box representing the activities is a code or link selectable to display the activity document that provides an activity planning chart and detailed information describing the activity.

Clicking on any boxes representing the activities in the high level display 810 opens an operations activity document. For example, clicking on Unit Management 816 opens the Unit Management activity document 900, as shown in FIG. 9.

Referring to FIG. 9, in a preferred embodiment for an operations activity document 900, an activity planning chart 902 is provided. The activity planning chart 902 gives a planner access to tasks 904 through 912. As in the development activity planning chart 602, tasks 904 through 912 are the series of actions, typically having a singular deliverable, required to complete the activity. Unlike the development activity planning chart 602, the operations activity planning chart has no transition points. This is a reflection of the non-linear nature of the processes defined in an operations methodology. The operations activity planning chart 902 also details the interrelationships 914 between the tasks.

Preferably, embedded in the area of each box representing the tasks is a code or link selectable to display the task document that provides a task planning chart and detailed information describing the activity. When the link is present, clicking on a task box in the activity planning chart opens a task document. In some embodiments, due to a paucity of detail for separate tasks, the task details may also be described in the activity document, or hypertext links provided to the task description.

Other information may also be included in the operations activity document 900. Objectives 920 provided list of the principle objectives and outcomes for the activity. The inputs and outputs of the activity, which may be deliverables or composites, may also be included. Primary inputs 922 provide a list of the most important inputs to the activity. Optionally, a list of secondary inputs may also be provided. Similarly, primary deliverables 924 information may be provided, as may secondary deliverable information. Responsible and participating role information 928 and 930 may also be displayed for the activity. Information regarding the activity's relationships with other activities 932 may be provided. Optionally, Planning Considerations 932 may be displayed. Staffing, managing and standards considerations (not shown) may also be incorporated into the document 900.

Finally, the activity document 900 may include links to supplemental information. In one embodiment, the supplemental information section may provide links to job aids and reference materials. Optionally, links to external resources may also be provided.

Clicking on any of the tasks 904 through 914 on the activity planning chart 902 opens a task document, the lowest process level document in the methodology. An exemplary task document 1000 is shown in FIG. 10. For example, by clicking on the task box 904 labeled "Manage Unit Operations" the corresponding task document 1000 is displayed within the active browser window 908. Within the task document 1000, a task planning chart 1002 is provided. As described above, the task planning chart 902 contains a plurality of process steps depicted as boxes 1004 through 1014. Unlike the top level planning chart and the activity planning chart at the first and second levels of the framework hierarchy, the boxes depicting the steps are not linked to lower level documents. Rather, the details of each step are described at the bottom of the document under the title "Process Steps" 1018. The individual descriptions of the steps can be viewed by clicking the expand icon 1032 by each step label.

Other information may also be included in the task document 1000. Objectives 1020 provide a list of the principle objectives and outcomes for the task. The inputs and outputs of the task, which may be deliverables or composites, may also be included. Primary inputs 1022 provide a list of the most important inputs to the activity. Optionally, a list of secondary inputs may also be provided. Similarly, primary 1024 and secondary 1026 deliverable information may be provided. Responsible role information 1028 may also be displayed for the activity. Optionally, participating role information may also be provided in the task document 1000. Optionally, key considerations 1034 for the task may be displayed.

Finally, the activity document 1000 may include links to supplemental information. In one embodiment, these are a titled "See Also" section 1036, which may provide links to job aids 1038 or checklists and external resources may also be provided. Links to other types of external resources 1040 may also be incorporated into the task document.

While the invention has been described in conjunction with specific embodiments it is to be understood that many alternatives, modifications, and variations will be apparent to those skilled in the art in light of the foregoing detailed description. For example, while the embodiments discussed in this application relate to two types of methodologies: development methodologies and operations methodologies, the invention may be readily applicable to other types of methodologies. It is therefore intended that the foregoing description be regarded as illustrative rather than limiting, and that it be understood that it is the following claims, including all equivalents, that are intended to define the spirit and scope of this invention.

What is claimed:

1. A method for mapping a knowledge base into a hierarchical framework to facilitate reusability of task objects between related work domains, the method comprising:
   defining a set of taxonomies comprising members of a universe of activity objects for a first methodology;
   organizing a set of task objects of singular granularity into object groups having in common a relation to one member of the taxonomy; and
   publishing onto an application server for access by a user through an electronic display a plurality of documents having a hierarchical linkage, wherein a highest level document displays the set of taxonomies with links to a set of second level documents, each second level document representing an activity object instantiating a single member of the taxonomy, the second level document having links to a group of third-level documents, each third level document representing a task objects instantiating a single task object of singular granularity;
   receiving from the user, through the electronic display, a methodology mapping selection for a plurality of methodologies, including the first methodology and a second methodology; and
   mapping, with the methodology mapping selection, each methodology of the plurality of methodologies to a selection of a set of taxonomies from the user, whereby an instantiation of an activity object from the first methodology may be reused for the second methodology.

2. The method of claim 1, wherein the activity objects are established by defining a first set of taxonomies sharing in common a first characteristic inherent to each member in the first set of taxonomies; and defining a second set of taxonomies sharing in common a second characteristic inherent to each member in the second set of taxonomies; the first set of characteristics being independent of the second set of characteristics; and associating with an activity object one member of the first set of taxonomies and one member of the second set of taxonomies.

3. The method of claim 2, wherein the first characteristic is a time sequence, and the second characteristic is a skill set.

4. The method of claim 1, wherein the activity objects correspond to activities that describe a process of one of the methodologies, wherein each activity object includes role information that identifies skill sets needed to complete a task for the activity; wherein the task objects corresponds to tasks that describe each activity; and wherein a set of steps describe each task.

5. The method of claim 4, wherein the activities include: Human Resources, Unit Management, Finance and Reporting, Performance Measurement, Process and Quality Management, Service Management, Technology Enablement, and Facilities and Equipment.

6. The method of claim 4, wherein the activities include: analyzing, designing, building and testing application.

7. The method of claim 1, wherein the activities correspond to a group of processes that are usually performed by a team of people with related skill sets, the group of processes including: project management, application, content, technical architecture, training and performance support, business process, organization, facilities and equipment, and service introduction;
   wherein for each of the group of processes at least one activity corresponds to one of the group comprising: analyzing, designing, building, and testing; and
   wherein the task objects of singular granularity comprise a single outcome.

8. The method of claim 7, wherein one object group is associated with planning the implementation of an application development project for one of the methodologies, and defining a set of tasks for deploying the application development project.

9. The method of claim 1, where the highest level document represents one of the methodologies mapped to one of the selections of a set of taxonomies; where each of the second level documents are activity documents that identify activity objects for one of the respective taxonomies from the set of taxonomies; and where each of the third level documents are task documents that identify task objects for one of the activity documents.

10. The method of claim 9, where each of the activity documents include an activity planning chart that contains graphically depicted tasks for the task objects.

11. The method of claim 10, where each of the activity documents employ colors to designate the roles for the tasks associated with the activities objects.

12. The method of claim 9, where each of the task documents include: a task planning chart that contains process steps for each of the tasks; and a list of the principle objectives and outcomes for each of the tasks.

\* \* \* \* \*